(12) United States Patent
Sagami et al.

(10) Patent No.: US 11,781,002 B2
(45) Date of Patent: Oct. 10, 2023

(54) FLUORINE-CONTAINING ELASTOMER COMPOSITION FOR HEAT DISSIPATION MATERIAL AND SHEET THEREOF

(71) Applicant: DAIKIN INDUSTRIES, LTD., Osaka (JP)

(72) Inventors: Hiroyuki Sagami, Osaka (JP); Junpei Terada, Osaka (JP); Hiroshi Aihara, Osaka (JP); Takayuki Matsuo, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 160 days.

(21) Appl. No.: 16/761,007

(22) PCT Filed: Oct. 30, 2018

(86) PCT No.: PCT/JP2018/040331
§ 371 (c)(1),
(2) Date: May 1, 2020

(87) PCT Pub. No.: WO2019/088100
PCT Pub. Date: May 9, 2019

(65) Prior Publication Data
US 2020/0308389 A1  Oct. 1, 2020

(30) Foreign Application Priority Data

Nov. 2, 2017  (JP) .................. 2017-212962

(51) Int. Cl.
| | | |
|---|---|---|
| C08L 27/16 | (2006.01) | |
| C08K 3/14 | (2006.01) | |
| C08K 3/22 | (2006.01) | |
| C08K 3/28 | (2006.01) | |
| C08K 3/38 | (2006.01) | |

(52) U.S. Cl.
CPC .............. *C08L 27/16* (2013.01); *C08K 3/14* (2013.01); *C08K 2003/222* (2013.01); *C08K 2003/2227* (2013.01); *C08K 2003/2296* (2013.01); *C08K 2003/282* (2013.01); *C08K 2003/385* (2013.01); *C08K 2201/001* (2013.01); *C08K 2201/011* (2013.01); *C08L 2207/04* (2013.01)

(58) Field of Classification Search
None
See application file for complete search history.

(56) References Cited

U.S. PATENT DOCUMENTS

| | | | |
|---|---|---|---|
| 6,239,202 B1 | 5/2001 | Osaheni et al. | |
| 6,776,226 B1* | 8/2004 | Cheng ................. | H01L 23/3737 165/905 |
| 2003/0125463 A1* | 7/2003 | Tatsu ....................... | C08K 5/54 525/326.3 |
| 2004/0180209 A1* | 9/2004 | Cheng ..................... | C08L 27/06 428/421 |
| 2004/0229992 A1 | 11/2004 | Sato et al. | |
| 2008/0306196 A1* | 12/2008 | Irie ........................ | B82Y 30/00 524/379 |
| 2011/0021716 A1* | 1/2011 | Washino .............. | C08F 214/265 525/359.1 |
| 2012/0077925 A1* | 3/2012 | Terada .................... | F16J 15/102 524/495 |
| 2012/0289641 A1* | 11/2012 | Hirano ..................... | C08K 3/14 524/443 |
| 2013/0240778 A1 | 9/2013 | Imada | |
| 2015/0252242 A1* | 9/2015 | Pham ....................... | C08K 7/00 252/75 |
| 2016/0376411 A1 | 12/2016 | Aida et al. | |
| 2017/0066955 A1* | 3/2017 | Chen ...................... | C09K 5/14 |
| 2018/0127629 A1 | 5/2018 | Takanashi et al. | |
| 2019/0169415 A1* | 6/2019 | Matsumoto ....... | H01L 21/67069 |
| 2019/0344496 A1* | 11/2019 | Bartow ................... | C08L 27/16 |

FOREIGN PATENT DOCUMENTS

| | | |
|---|---|---|
| CN | 101220191 A | 7/2008 |
| CN | 106496886 A | 3/2017 |
| JP | 2000-336268 A | 12/2000 |
| JP | 2004-331896 A | 11/2004 |
| JP | 2007-158171 A | 6/2007 |
| JP | 2010-232535 A | 10/2010 |
| JP | 4737088 B2 | 7/2011 |
| JP | 2015-067737 A | 4/2015 |
| JP | 2016-050662 A | 4/2016 |
| JP | 2016-199666 A | 12/2016 |
| KR | 10-2016-0137514 A | 11/2016 |
| WO | 2016/190188 A1 | 12/2016 |

OTHER PUBLICATIONS

"2002 JIS Handbook 28 Rubber", 2002 JIS Handbook 28 Rubber, edited by Japanese Standards Association, pp. 1-5.
Daikin Product Information of Dai-El™ G-755, Nov. 2008, pp. 1-3.

(Continued)

*Primary Examiner* — Satya B Sastri
(74) *Attorney, Agent, or Firm* — Sughrue Mion, PLLC

(57) ABSTRACT

A fluorine-containing elastomer composition for a heat dissipation material, including a fluorine-containing elastomer being VdF-based fluoroelastomer having a Mooney viscosity at 121° C. of 10 or lower and an insulating thermal conductive filler. Also disclosed is a sheet obtained by molding the fluorine-containing elastomer composition.

6 Claims, No Drawings

(56) References Cited

OTHER PUBLICATIONS

International Search Report of PCT/JP2018/040331 dated Feb. 5, 2019 [PCT/ISA/210].
Communication dated Mar. 31, 2021, from the European Patent Office in European Application No. 18874815.6.
International Preliminary Report on Patentability with Translation of Written Opinion of the International Searching Authority for PCT/JP2018/040331 dated May 5, 2020.
Agriculture Press, "Properties and Processing Technologies of Natural Rubber", Textbooks of Secondary Specialized School of Agriculture, 1st Edition, May 1989, pp. 9 pages total—Partial Translation.
Potting Gel SIFEL8000 series, Product Listing, Copyright 2001-2020, Shin-Etsu Chemical Co., Ltd. (10 pages total).
Elastomer of Liquid Injection Molding SIFEL3000 series, Product Listing, Copyright 2001-2020, Shin-Etsu Chemical Co., Ltd. (11 pages total).

* cited by examiner

FLUORINE-CONTAINING ELASTOMER COMPOSITION FOR HEAT DISSIPATION MATERIAL AND SHEET THEREOF

CROSS REFERENCE TO RELATED APPLICATIONS

This application is a National Stage of International Application No. PCT/JP2018/040331, filed Oct. 30, 2018, claiming priority to Japanese Patent Application No. 2017-212962, filed Nov. 2, 2017.

TECHNICAL FIELD

The invention relates to fluorine-containing elastomer compositions for a heat dissipation material and sheets thereof.

BACKGROUND ART

Fluorine-containing elastomers have excellent chemical resistance, solvent resistance, and heat resistance, and are thus widely used in various fields such as automotive industry, semiconductor industry, and chemical industry. In the automotive industry, for example, fluorine-containing elastomers are used for members such as hoses and sealing materials of devices such as engines and their peripheral devices, automatic transmission (AT) devices, and fuel systems and their peripheral devices.

Recent electrification and hybridization for automobiles cause development of next-generation power semiconductors such as SiC in order to allow inverters to have increased output power and improved power conversion efficiency. Such an increase in the output power increases the amount of heat generation, which generates a demand for highly heat-resistant heat dissipation materials used in peripheral members.

Patent Literature 1 proposes a heat-resistant heat dissipation sheet that is hardly damaged and maintains sufficient flexibility even used at high temperature. The heat dissipation sheet contains a binder formed from a rubbery elastic body containing a fluorinated polyether skeleton as the main chain, and a thermal conductive filler. Patent Literature document 2 aims to provide a cured rubber with good properties such as thermal conductivity and proposes a curable fluoropolyether rubber composition containing components such as a linear fluoropolyether compound having at least two alkenyl groups in a molecule and a perfluoropolyether structure in the backbone. Patent Literature 3 proposes a thermal conductive sheet that generates a sufficiently reduced amount of particles and is suitable to a semiconductor manufacturing device. The thermal conductive sheet is a cured product of a thermal conductive resin composition that contains components such as a thermal conductive filler and a crosslinkable component containing two compounds each containing a perfluoroalkyl ether structure in the main chain.

Patent Literature 4 proposes a thermal conductive material containing a fluorine-containing elastomer having a Mooney viscosity at 121° C. of less than 60 and a thermal conductive filler in an amount of 40 to 65% by volume of the thermal conductive material.

CITATION LIST

Patent Literature

Patent Literature 1: JP 2010-232535 A
Patent Literature 2: JP 2004-331896 A
Patent Literature 3: JP 2015-067737 A
Patent Literature 4: US 2017/0066955 A

SUMMARY OF INVENTION

Technical Problem

The sheets and compositions disclosed in Patent Literature documents 1 to 3 are unfortunately expensive. Patent Literature 4 discusses only thermal conductive materials whose Mooney viscosity at 121° C. is at least about 25. Such thermal conductive materials have insufficient flexibility.

The invention aims to provide a fluorine-containing elastomer composition for a heat dissipation material having excellent flexibility and thermal conductivity.

Solution to Problem

The inventors made studies on increasing the flexibility and thermal conductivity of thermal conductive materials formed from fluorine-containing elastomers to find that use of a fluorine-containing elastomer having a specific Mooney viscosity can significantly improve the flexibility as well as the thermal conductivity, completing the invention.

In other words, the invention relates to a fluorine-containing elastomer composition for a heat dissipation material, including a fluorine-containing elastomer having a Mooney viscosity at 121° C. of 10 or lower and an insulating thermal conductive filler.

The fluorine-containing elastomer preferably contains a structural unit derived from at least one monomer selected from the group consisting of tetrafluoroethylene, vinylidene fluoride, and an unsaturated perfluoroethylenic compound represented by the following formula (1):

$$CF_2=CF-Rf^a \qquad (1)$$

wherein $Rf^a$ is $-CF_3$ or $-ORf^b$, where $Rf^b$ is a C1-C5 perfluoroalkyl group.

The insulating thermal conductive filler is preferably at least one selected from the group consisting of aluminum oxide, aluminum nitride, boron nitride, silicon nitride, silicon carbide, magnesium oxide, and zinc oxide.

The insulating thermal conductive filler is preferably present in an amount of 70 to 90% by volume of the fluorine-containing elastomer composition for a heat dissipation material.

Preferably, the insulating thermal conductive filler is further treated with a silane coupling agent.

The insulating thermal conductive filler preferably has a particle size of 0.1 to 200 μm.

The invention also relates to a sheet obtainable by molding the fluorine-containing elastomer composition for a heat dissipation material.

Advantageous Effects of Invention

The fluorine-containing elastomer composition for a heat dissipation material of the invention contains a fluorine-containing elastomer having a specific Mooney viscosity and an insulating thermal conductive filler, and thus can provide a sheet having excellent flexibility and thermal conductivity.

DESCRIPTION OF EMBODIMENTS

The fluorine-containing elastomer composition for a heat dissipation material of the invention contains a fluorine-containing elastomer having a Mooney viscosity at 121° C. of 10 or lower and an insulating thermal conductive filler.

The fluorine-containing elastomer used in the invention preferably contains a structural unit derived from at least one monomer selected from the group consisting of tetrafluoroethylene (TFE), vinylidene fluoride (VdF), and an unsaturated perfluoroethylenic compound (e.g., hexafluoropropylene (HFP), perfluoro(alkyl vinyl ether) (PAVE)) represented by the following formula (1):

$$CF_2=CF-R_f^a \qquad (1)$$

(wherein $R_f^a$ is —$CF_3$ or —$OR_f^b$, where $R_f^b$ is a C1-C5 perfluoroalkyl group).

From a different point of view, examples of the fluorine-containing elastomer include non-perfluoro fluoroelastomers and perfluoro fluoroelastomers.

Examples of the non-perfluoro fluoroelastomers include VdF-based fluoroelastomers, TFE/propylene (Pr)-based fluoroelastomers, TFE/Pr/VdF-based fluoroelastomers, ethylene (Et)/HFP-based fluoroelastomers, Et/HFP/VdF-based fluoroelastomers, Et/HFP/TFE-based fluoroelastomers, fluorosilicone-based fluoroelastomers, and fluorophosphazene-based fluoroelastomers. These fluoroelastomers may be used alone or in any combination to the extent that the effects of the invention are not impaired. Preferred among these are VdF-based fluoroelastomers, TFE/Pr-based fluoroelastomers, and TFE/Pr/VdF-based fluoroelastomers in order to achieve good heat-aging resistance and oil resistance.

The VdF-based fluoroelastomer is a fluoroelastomer containing a VdF repeating unit. The amount of the VdF repeating unit in the VdF-based fluoroelastomer is preferably 20 mol % or more and 90 mol % or less, more preferably 40 mol % or more and 85 mol % or less, of the sum of the moles of the VdF repeating unit and a repeating unit derived from a different comonomer. The lower limit is further preferably 45 mol %, particularly preferably 50 mol %. The upper limit is further preferably 80 mol %.

The comonomer in the VdF-based fluoroelastomer may be any comonomer copolymerizable with VdF, and examples thereof include fluorine-containing monomers such as TFE, HFP, PAVE, chlorotrifluoroethylene (CTFE), trifluoroethylene, trifluoropropylene, tetrafluoropropylene, pentafluoropropylene, trifluorobutene, tetrafluoroisobutene, hexafluoroisobutene, vinyl fluoride, iodine-containing fluorinated vinyl ether, and a fluorine-containing monomer represented by the following formula (2):

$$CH_2=CRf \qquad (2)$$

(wherein Rf is a C1-C12 linear or branched fluoroalkyl group), fluorine-free monomers such as ethylene (Et), propylene (Pr), and alkyl vinyl ether, monomers giving a crosslinkable group (cure site), and reactive emulsifiers. One of these monomers and compounds may be used alone, or two or more of these may be used in combination.

The PAVE is more preferably perfluoro(methyl vinyl ether) (PMVE) or perfluoro(propyl vinyl ether) (PPVE), particularly preferably PMVE.

The PAVE used may also be perfluorovinyl ether represented by the following formula:

$$CF_2=CFOCF_2ORf^c$$

(wherein $Rf^c$ is a C1-C6 linear or branched perfluoroalkyl group, a C5-C6 cyclic perfluoroalkyl group, or a C2-C6 linear or branched perfluorooxyalkyl group containing 1 to 3 oxygen atoms). For example, $CF_2=CFOCF_2OCF_3$, $CF_2=CFOCF_2OCF_2CF_3$, or $CF_2=CFOCF_2OCF_2CF_2OCF_3$ is preferably used.

The fluorine-containing monomer represented by the formula (2) is preferably a monomer wherein Rf is a linear fluoroalkyl group, more preferably a monomer wherein Rf is a linear perfluoroalkyl group. The number of carbon atoms in Rf is preferably 1 to 6.

Examples of the fluorine-containing monomer represented by the formula (2) include $CH_2=CFCF_3$, $CH_2=CFCF_2CF_3$, $CH_2=CFCF_2CF_2CF_3$, and $CH_2=CFCF_2CF_2CF_2CF_3$. Preferred among these is 2,3,3,3-tetrafluoropropylene represented by $CH_2=CFCF_3$.

The VdF-based fluoroelastomer is preferably at least one copolymer selected from the group consisting of VdF/HFP copolymers, VdF/TFE/HFP copolymers, VdF/CTFE copolymers, VdF/CTFE/TFE copolymers, VdF/PAVE copolymers, VdF/TFE/PAVE copolymers, VdF/HFP/PAVE copolymers, VdF/HFP/TFE/PAVE copolymers, VdF/TFE/Pr copolymers, VdF/Et/HFP copolymers, and copolymers of VdF and a fluorine-containing monomer represented by the formula (2). The VdF-based fluoroelastomer is more preferably a copolymer containing at least one comonomer selected from the group consisting of TFE, HFP, and PAVE, as a comonomer other than VdF.

Preferred among these is at least one copolymer selected from the group consisting of VdF/HFP copolymers, VdF/TFE/HFP copolymers, copolymers of VdF and a fluorine-containing monomer represented by the formula (2), VdF/PAVE copolymers, VdF/TFE/PAVE copolymers, VdF/HFP/PAVE copolymers, and VdF/HFP/TFE/PAVE copolymers, more preferred is at least one copolymer selected from the group consisting of VdF/HFP copolymers, VdF/HFP/TFE copolymers, copolymers of VdF and a fluorine-containing monomer represented by the formula (2), and VdF/PAVE copolymers, and particularly preferred is at least one copolymer selected from the group consisting of VdF/HFP copolymers, copolymers of VdF and a fluorine-containing monomer represented by the formula (2), and VdF/PAVE copolymers.

The VdF/HFP copolymer preferably has a VdF/HFP composition of (45 to 85)/(55 to 15) (mol %), more preferably (50 to 80)/(50 to 20) (mol %), still more preferably (60 to 80)/(40 to 20) (mol %).

The VdF/HFP composition is also preferably (50 to 78)/(50 to 22) (mol %).

The VdF/TFE/HFP copolymer preferably has a VdF/TFE/HFP composition of (30 to 80)/(4 to 35)/(10 to 35) (mol %).

The VdF/PAVE copolymer preferably has a VdF/PAVE composition of (65 to 90)/(35 to 10) (mol %).

In a preferred embodiment, the VdF/PAVE composition is (50 to 78)/(50 to 22) (mol %).

The VdF/TFE/PAVE copolymer preferably has a VdF/TFE/PAVE composition of (40 to 80)/(3 to 40)/(15 to 35) (mol %).

The VdF/HFP/PAVE copolymer preferably has a VdF/HFP/PAVE composition of (65 to 90)/(3 to 25)/(3 to 25) (mol %).

The VdF/HFP/TFE/PAVE copolymer preferably has a VdF/HFP/TFE/PAVE composition of (40 to 90)/(0 to 25)/(0 to 40)/(3 to 35) (mol %), more preferably (40 to 80)/(3 to 25)/(3 to 40)/(3 to 25) (mol %).

Preferably, the copolymer containing VdF and a fluorine-containing monomer (2) represented by the formula (2) has a VdF/fluorine-containing monomer (2) unit composition of 85/15 to 20/80 (mol %) and satisfies that a unit of a monomer other than VdF and the (2) is present at a proportion of the sum of the proportions of the units of the monomers other than VdF and the fluorine-containing monomer (2) is 0 to 50 mol % of all the monomer units, more preferably has a VdF/fluorine-containing monomer (2) unit mol % composition of 80/20 to 20/80. In a preferred embodiment, the VdF/fluorine-containing monomer (2) unit composition is 78/22 to 50/50 (mol %).

Also preferably, the VdF/fluorine-containing monomer (2) unit composition is 85/15 to 50/50 (mol %) and a unit of a monomer other than VdF and the (2) is present at a proportion of 1 to 50 mol % of all the monomer units. Preferred examples of the monomer other than VdF and the fluorine-containing monomer (2) include monomers mentioned as examples of comonomers for VdF, such as TFE, HFP, PMVE, perfluoroethyl vinyl ether (PEVE), PPVE, CTFE, trifluoroethylene, hexafluoroisobutene, vinyl fluoride, Et, Pr, alkyl vinyl ether, monomers giving a crosslinkable group and reactive emulsifiers. More preferred are PMVE, CTFE, HFP, and TFE.

The TFE/Pr-based fluoroelastomer herein means a fluorine-containing copolymer containing 45 to 70 mol % of TFE and 55 to 30 mol % of Pr. In addition to these two components, the fluoroelastomer may contain 0 to 40 mol % of a specific third component (e.g., PAVE).

The Et/HFP copolymer preferably has an Et/HFP composition of (35 to 80)/(65 to 20) (mol %), more preferably (40 to 75)/(60 to 25) (mol %).

The Et/HFP/TFE copolymer preferably has an Et/HFP/TFE composition of (35 to 75)/(25 to 50)/(0 to 15) (mol %), more preferably (45 to 75)/(25 to 45)/(0 to 10) (mol %).

An example of the perfluoro fluoroelastomer is in the form of a TFE/PAVE copolymer. The TFE/PAVE composition is preferably (50 to 90)/(50 to 10) (mol %), more preferably (50 to 80)/(50 to 20) (mol %), still more preferably (55 to 75)/(45 to 25) (mol %).

In this case, examples of the PAVE include PMVE and PPVE. These may be used alone or in any combination.

The fluorine-containing elastomer preferably has a number average molecular weight Mn of 1000 to 100000, still more preferably 2000 to 80000, particularly preferably 3000 to 70000.

In order to reduce the viscosity of the fluorine-containing elastomer composition for a heat dissipation material, for example, a different fluoroelastomer may be blended with the fluorine-containing elastomer. Examples of this different fluoroelastomer include a low-molecular-weight liquid fluoroelastomer (number average molecular weight: 1000 or higher), a low-molecular-weight fluoroelastomer with an approximate number average molecular weight of 10000, and a fluoroelastomer with an approximate number average molecular weight of 100000 to 200000.

The fluorine-containing elastomer preferably has a fluorine content of 50% by mass or more, more preferably 55% by mass or more, still more preferably 60% by mass or more. The upper limit of the fluorine content is preferably, but not limited to, 71% by mass or less.

The fluorine-containing elastomer has a Mooney viscosity at 121° C. of 10 or lower, preferably 8 or lower, more preferably 5 or lower. The fluorine-containing elastomer thus has a quite low Mooney viscosity, so that it achieves excellent flexibility and improved adhesion with exothermic materials, having a significantly increased effect of dissipating heat even when a large amount of an insulating thermal conductive filler is added to the fluorine-containing elastomer. The Mooney viscosity refers to a value determined in conformity with ASTM D1646 and JIS K6300.

The non-perfluoro fluoroelastomers and perfluoro fluoroelastomers as described hereinabove may be produced by a common method such as emulsion polymerization, suspension polymerization, or solution polymerization. In particular, a polymerization technique known as iodine (bromine) transfer polymerization using an iodine (bromine) compound enables production of a fluoroelastomer with a narrow molecular weight distribution.

The aforementioned examples of the non-perfluoro fluoroelastomers and perfluoro fluoroelastomers are the structures of main monomers. Those formed by copolymerization with a monomer giving a crosslinkable group may also be used. The monomer giving a crosslinkable group may be any monomer that can introduce an appropriate crosslinkable group in accordance with the production method and crosslinking system. Examples thereof include known polymerizable compounds and chain-transfer agents containing substances such as an iodine atom, a bromine atom, a carbon-carbon double bond, a cyano group, a carboxyl group, a hydroxyl group, an amino group, and an ester group.

A preferred example of the monomer giving a crosslinkable group is a compound represented by the following formula (3):

(wherein $Y^1$ and $Y^2$ are each a fluorine atom, a hydrogen atom, or —$CH_3$; $R_f^2$ is a linear or branched fluorine-containing alkylene group which optionally contains one or more oxygen atoms as ether bonds and optionally contains an aromatic ring, and in which any or all of the hydrogen atoms are replaced by fluorine atoms; and $X^1$ is an iodine atom or a bromine atom). Specific examples thereof include an iodine- or bromine-containing monomer represented by the following formula (4):

(wherein $Y^1$, $Y^2$, and $X^1$ are defined as described above; $R_f^3$ is a linear or branched fluorine-containing alkylene group which optionally contains one or more oxygen atoms as ether bonds and in which any or all of the hydrogen atoms are replaced by fluorine atoms, i.e., a linear or branched fluorine-containing alkylene group in which any or all of the hydrogen atoms are replaced by fluorine atoms, a linear or branched fluorine-containing oxyalkylene group in which any or all of the hydrogen atoms are replaced by fluorine atoms, or a linear or branched fluorine-containing polyoxyalkylene group in which any or all of the hydrogen atoms are replaced by fluorine atoms; and $R^1$ is a hydrogen atom or a methyl group) and iodine- or bromine-containing monomers represented by any of the following formulae (5) to (22):

(wherein $Y^4$s are the same as or different from each other, and are each a hydrogen atom or a fluorine atom; and n is an integer of 1 to 8);

(wherein

[Chem. 1]

$Rf^4$ is —(OCF$_2$)$_n$— or —(OCF(CF$_3$))$_n$— and n is an integer of 0 to 5);

(wherein m is an integer of 0 to 5; and n is an integer of 0 to 5);

$$CF_2=CFCF_2(OCH_2CF_2CF_2)_m(OCF(CF_3)CF_2)_nOCF(CF_3)-X^1 \quad (8)$$

(wherein m is an integer of 0 to 5; and n is an integer of 0 to 5);

$$CF_2=CF(OCF_2CF(CF_3))_mO(CF_2)_n-X^1 \quad (9)$$

(wherein m is an integer of 0 to 5; and n is an integer of 1 to 8);

$$CF_2=CF(OCF_2CF(CF_3))_m-X^1 \quad (10)$$

(wherein m is an integer of 1 to 5);

$$CF_2=CFOCF_2(CF(CF_3)OCF_2)_nCF(-X^1)CF_3 \quad (11)$$

(wherein n is an integer of 1 to 4);

$$CF_2=CFO(CF_2)_nOCF(CF_3)-X^1 \quad (12)$$

(wherein n is an integer of 2 to 5);

$$CF_2=CFO(CF_2)_n-(C_6H_4)-X^1 \quad (13)$$

(wherein n is an integer of 1 to 6);

$$CF_2=CF(OCF_2CF(CF_3))_nOCF_2CF(CF_3)-X^1 \quad (14)$$

(wherein n is an integer of 1 or 2);

$$CH_2=CFCF_2O(CF(CF_3)CF_2O)_nCF(CF_3)-X^1 \quad (15)$$

(wherein n is an integer of 0 to 5);

$$CF_2=CFO(CF_2CF(CF_3)O)_m(CF_2)_n-X^1 \quad (16)$$

(wherein m is an integer of 0 to 5; and n is an integer of 1 to 3);

$$CH_2=CFCF_2OCF(CF_3)OCF(CF_3)-X^1 \quad (17);$$

$$CH_2=CFCF_2OCH_2CF_2-X^1 \quad (18);$$

$$CF_2=CFO(CF_2CF(CF_3)O)_mCF_2CF(CF_3)-X^1 \quad (19)$$

(wherein m is an integer of 0 or greater);

$$CF_2=CFOCF(CF_3)CF_2O(CF_2)_n-X^1 \quad (20)$$

(wherein n is an integer of 1 or greater);

$$CF_2=CFOCF_2OCF_2CF(CF_3)OCF_2-X^1 \quad (21); \text{ and}$$

$$CH_2=CH-(CF_2)_nX^1 \quad (22)$$

(wherein n is an integer of 2 to 8).

In the formulae (5) to (22), $X^1$ is defined in the same manner as mentioned above. These may be used alone or in any combination.

Preferred examples of the iodine- or bromine-containing monomer represented by the formula (4) include iodine-containing fluorinated vinyl ethers represented by the following formula (23):

[Chem. 2]

$$I(CH_2CF_2CF_2O)_m(\overset{CF_3}{\underset{|}{C}}FCF_2O)_nCF=CF_2 \quad (23)$$

(wherein m is an integer of 1 to 5; and n is an integer of 0 to 3). More specifically, those represented by the following formulae:

[Chem. 3]

$$ICH_2CF_2CF_2OCF=CF_2, \quad I(CH_2CF_2CF_2O)_2CF=CF_2,$$

$$I(CH_2CF_2CF_2O)_3CF=CF_2, \quad ICH_2CF_2CF_2O\overset{CF_3}{\underset{|}{C}}FCF_2OCF=CF_2,$$

$$ICH_2CF_2CF_2O(\overset{CF_3}{\underset{|}{C}}FCF_2O)_3CF=CF_2$$

may be mentioned. Preferred among these is $ICH_2CF_2CF_2OCF=CF_2$.

More preferred specific examples of the iodine- or bromine-containing monomer represented by the formula (5) include $ICF_2CF_2CF=CH_2$ and $I(CF_2CF_2)_2CF=CH_2$.

A more preferred specific example of the iodine- or bromine-containing monomer represented by the formula (9) is $I(CF_2CF_2)_2OCF=CF_2$.

More preferred specific examples of the iodine- or bromine-containing monomer represented by the formula (22) include $CH_2=CHCF_2CF_2I$ and $I(CF_2CF_2)_2CH=CH_2$.

Another preferred example of the monomer giving a crosslinkable group is a bisolefin compound represented by the following formula:

$$R^2R^3C=CR^4-Z-CR^5=CR^6R^7$$

(wherein $R^2$, $R^3$, $R^4$, $R^5$, $R^6$, and $R^7$ are the same as or different from each other, and are each H or a C1-C5 alkyl group; and Z is a C1-C18 linear or branched alkylene group which optionally contains an oxygen atom and is preferably at least partially fluorinated, a cycloalkylene group, or a (per) fluoropolyoxyalkylene group). The "(per) fluoropolyoxyalkylene group" herein means a "fluoropolyoxyalkylene group or perfluoropolyoxyalkylene group".

Z is preferably a C4-C12 (per)fluoroalkylene group, and $R^2$, $R^3$, $R^4$, $R^5$, $R^6$, and $R^7$ are each preferably a hydrogen atom.

With Z being a (per)fluoropolyoxyalkylene group, preferred is a (per)fluoropolyoxyalkylene group represented by the following formula:

$$-(Q)_p-CF_2O-(CF_2CF_2O)_m-(CF_2O)_nCF_2-(Q)_p-$$

(wherein Q is a C1-C10 alkylene group or a C2-C10 oxyalkylene group; p is 0 or 1; and m and n are integers that give an m/n ratio of 0.2 to 5 and allow the (per)fluoropolyoxyalkylene group to have a molecular weight of 500 to 10000, preferably 1000 to 4000). In this formula, Q is preferably selected from $-CH_2OCH_2-$ and $-CH_2O(CH_2CH_2O)_sCH_2-$ (wherein s=1 to 3).

Preferred examples of the bisolefin include $CH_2=CH-(CF_2)_4-CH=CH_2$, $CH_2=CH-(CF_2)_6-CH=CH_2$, and $CH_2=CH-Z^1-CH=CH_2$ (wherein $Z^1$ is $-CH_2OCH_2-CF_2O-(CF_2CF_2O)_m-(CF_2O)_n-CF_2-CH_2OCH_2-$, where m/n is 0.5).

Preferred is 3,3,4,4,5,5,6,6,7,7,8,8-dodecafluoro-1,9-decadiene represented by $CH_2=CH-(CF_2)_6-CH=CH_2$.

The fluorine-containing elastomer composition for a heat dissipation material of the invention can be crosslinked in the presence of a cross-linking agent. An appropriate cross-linking agent may be selected according to the conditions such as the crosslinking system, the type of the fluorine-containing elastomer to be crosslinked (e.g., the composition of monomers for copolymerization, the presence or absence of a crosslinkable group, the type of the crosslinkable group), the specific application or conditions in use of the resulting crosslinked product, and the kneading conditions.

The fluorine-containing elastomer composition for a heat dissipation material of the invention may or may not contain a cross-linking agent.

When the cross-linking agent is present, the amount thereof is preferably 0.01 to 10 parts by mass, more preferably 0.1 to 9 parts by mass, particularly preferably 0.2 to 8 parts by mass, relative to 100 parts by mass of the fluorine-containing elastomer. In order to achieve excellent tensile strength at break of the crosslinked product, the amount of the cross-linking agent is preferably 0.5 parts by mass or more, more preferably 1.0 parts by mass or more, still more preferably 2.0 parts by mass or more.

Examples of the crosslinking system include a peroxide crosslinking system, a polyol crosslinking system, a polyamine crosslinking system, an oxazole crosslinking system, a thiazole crosslinking system, an imidazole crosslinking system, and a triazine crosslinking system.

In the case of crosslinking in a peroxide crosslinking system, the crosslinking point has a carbon-carbon bond, which leads to excellent chemical resistance and steam resistance in comparison with a polyol crosslinking system in which the crosslinking point has a carbon-oxygen bond and a polyamine crosslinking system in which the cross-linking point has a carbon-nitrogen double bond.

The peroxide cross-linking agent may be any peroxide that can easily generate peroxy radicals in the presence of heat or a redox system. Specific examples thereof include organic peroxides such as 1,1-bis(t-butylperoxy)-3,5,5-trimethylcyclohexane, 2,5-dimethylhexane-2,5-dihydroperoxide, di-t-butyl peroxide, t-butyl cumyl peroxide, dicumyl peroxide, α,α-bis(t-butylperoxy)-p-diisopropylbenzene, α,α-bis(t-butylperoxy)-m-diisopropylbenzene, α,α-bis(t-butylperoxy)-m-diisopropylbenzene, 2,5-dimethyl-2,5-di(t-butylperoxy)hexane, 2,5-dimethyl-2,5-di(t-butylperoxy)-hexyne-3, benzoyl peroxide, t-butylperoxybenzene, t-butyl peroxybenzoate, t-butyl peroxymaleate, and t-butylperoxyisopropylcarbonate. Preferred among these is 2,5-dimethyl-2,5-di(t-butylperoxy)hexane or 2,5-dimethyl-2,5-di(t-butylperoxy)-hexyne-3.

The peroxide cross-linking agent preferably usually contains a crosslinking accelerator. Examples of an accelerator for a peroxide cross-linking agent, especially an organic peroxide cross-linking agent include triallyl cyanurate, triallyl isocyanurate (TRIC), triacrylformal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, N,N-diallylacrylamide, 1,6-divinyldodecafluorohexane, hexaallyl phosphoramide, N,N,N',N'-tetraallyl phthalamide, N,N,N', N'-tetraallyl malonamide, trivinyl isocyanurate, 2,4,6-trivinyl methyl trisiloxane, tri(5-norbornene-2-methylene)cyanurate, and triallyl phosphite. In order to achieve good crosslinkability and good physical properties of the resulting crosslinked product, triallyl isocyanurate (TAIC) is preferred.

The crosslinking accelerator for a peroxide cross-linking system may also be a low self-polymerizable crosslinking accelerator. The low self-polymerizable crosslinking accelerator is a compound having low self-polymerizability, unlike triallyl isocyanurate (TAIC) which is well known as a crosslinking accelerator.

Examples of the low self-polymerizable crosslinking accelerator include:

trimetallyl isocyanurate (TMAIC) represented by the following formula:

[Chem. 4]

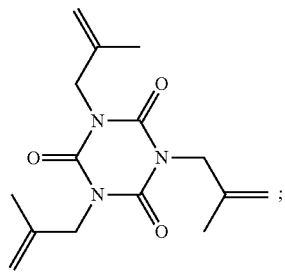

p-quinonedioxime represented by the following formula:

[Chem. 5]

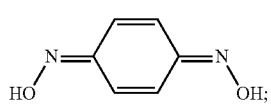

p,p'-dibenzoylquinonedioxime represented by the following formula:

[Chem. 6]

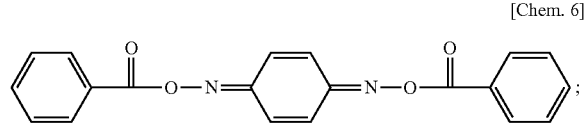

maleimide represented by the following formula:

[Chem. 7]

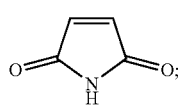

N-phenylene maleimide represented by the following formula:

[Chem. 8]

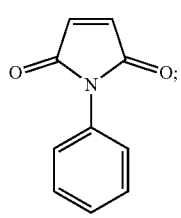

and
N,N'-phenylene bismaleimide represented by the following formula:

[Chem. 9]

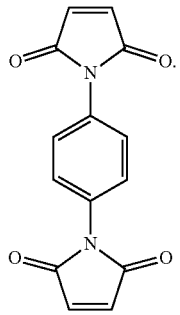

The low self-polymerizable crosslinking accelerator is preferably trimetallyl isocyanurate (TMAIC).

The crosslinking accelerator used for a peroxide cross-linking system may also be a bisolefin.

Examples of the bisolefin to be used as a crosslinking accelerator include bisolefins represented by the following formula:

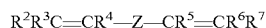

(wherein $R^2$, $R^3$, $R^4$, $R^5$, $R^6$, and $R^7$ are the same as or different from each other, and are each H or a C1-C5 alkyl group; and Z is a C1-C18 at least partially fluorinated alkylene or cycloalkylene group or a (per)fluoropolyoxyalkylene group, each of which is linear (straight-chain) or branched and optionally contains an oxygen atom).

Z is preferably a C4-C12 perfluoroalkylene group, and $R^2$, $R^3$, $R^4$, $R^5$, $R^6$, and $R^7$ are each preferably a hydrogen atom.

With Z being a (per)fluoropolyoxyalkylene group, preferred is a (per)fluoropolyoxyalkylene group represented by the following formula:

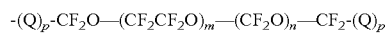

(wherein Q is a C1-C10 alkylene or oxyalkylene group; p is 0 or 1; and m and n are integers that give an m/n ratio of 0.2 to 5 and allow the (per)fluoropolyoxyalkylene group to have a molecular weight of 500 to 10000, preferably 1000 to 4000). In this formula, Q is preferably selected from —$CH_2OCH_2$— and —$CH_2O(CH_2CH_2O)_sCH_2$— (wherein s=1 to 3).

Preferred examples of the bisolefin include $CH_2$=CH—$(CF_2)_4$—CH=$CH_2$, $CH_2$=CH—$(CF_2)_6$—CH=$CH_2$, and $CH_2$=CH—$Z^1$—CH=$CH_2$ (wherein $Z^1$ is —$CH_2OCH_2$—$CF_2O$—$(CF_2CF_2O)_m$—$(CF_2O)_n$—$CF_2$—$CH_2OCH_2$—, where m/n is 0.5).

Preferred is 3,3,4,4,5,5,6,6,7,7,8,8-dodecafluoro-1,9-decadiene represented by $CH_2$=CH—$(CF_2)_6$—CH=$CH_2$.

In terms of crosslinkability, a preferred example of the fluorine-containing elastomer suitable for a peroxide crosslinking system is a fluoroelastomer containing as a crosslinking point an iodine atom and/or bromine atom. The amount of the iodine atom and/or bromine atom is preferably 0.001 to 10% by mass, still more preferably 0.01 to 5% by mass, particularly preferably 0.1 to 3% by mass, in order to achieve well-balanced physical properties.

The peroxide cross-linking agent is preferably added in an amount of 0.01 to 10 parts by mass, more preferably 0.1 to 9 parts by mass, particularly preferably 0.2 to 8 parts by mass, relative to 100 parts by mass of the fluorine-containing elastomer. Less than 0.01 parts by mass of the peroxide cross-linking agent tends to cause insufficient crosslinking of the fluorine-containing elastomer, while more than 10 parts by mass thereof tends to cause a reduced balance of the physical properties.

Usually, the amount of the crosslinking accelerator added is preferably 0.01 to 10 parts by mass, more preferably 0.1 to 9 parts by mass, relative to 100 parts by mass of the fluorine-containing elastomer. Less than 0.01 parts by mass of the crosslinking accelerator tends to cause undercure. More than 10 parts by mass thereof tends to cause a reduced balance of the physical properties.

In the case of crosslinking in a polyol crosslinking system, the crosslinking point has a carbon-oxygen bond, which is preferred in order to achieve a small compression set and excellent moldability.

The polyol cross-linking agent may be a compound conventionally known as a cross-linking agent for a fluoroelastomer. A preferred example is a polyhydroxy compound, and a particularly preferred example is a polyhydroxy aromatic compound in order to achieve excellent heat resistance.

Examples of the polyhydroxy aromatic compound include, but are not limited to, 2,2-bis(4-hydroxyphenyl)propane (hereinafter, referred to as bisphenol A), 2,2-bis(4-hydroxyphenyl)perfluoropropane (hereinafter, referred to as bisphenol AF), resorcin, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (hereinafter, referred to as bisphenol B), 4,4-bis(4-hydroxyphenyl)valeric acid, 2,2-bis(4-hydroxyphenyl)tetrafluorodichloropropane, 4,4'-dihydroxydiphenylsulfone, 4,4'-dihydroxydiphenylketone, tri(4-hydroxyphenyl)methane, 3,3',5,5'-tetrachlorobisphenol A, and 3,3',5,5'-tetrabromobisphenol A. These polyhydroxy aromatic compounds each may also be in the form of an alkali metal salt, an alkaline earth metal salt, or the like. In the case of coagulating the copolymer with an acid, no such metal salts are preferably used.

Preferred among these is a polyhydroxy compound in order to achieve a small compression set and excellent moldability of the resulting crosslinked product, for example. More preferred among these is a polyhydroxy aromatic compound in order to achieve excellent heat resistance. Still more preferred is bisphenol AF.

In the case of crosslinking in a usual polyol crosslinking system, a crosslinking accelerator is preferably used. Use of a crosslinking accelerator can accelerate generation of a double bond in a molecule during a dehydrofluorination reaction of the fluoroelastomer main chain and addition of a polyhydroxy compound to the generated double bond, resulting in acceleration of the crosslinking reaction.

A typical crosslinking accelerator used in a polyol crosslinking system is an onium compound. Examples of the onium compound include, but are not limited to, ammonium compounds such as a quaternary ammonium salt, phosphonium compounds such as a quaternary phosphonium salt, oxonium compounds, sulfonium compounds, cyclic amines, and monofunctional amine compounds. Preferred among these are a quaternary ammonium salt and a quaternary phosphonium salt.

Examples of the quaternary ammonium salts include, but are not limited to, 8-methyl-1,8-diazabicyclo[5,4,0]-7-undecenium chloride, 8-methyl-1,8-diazabicyclo[5,4,0]-7-undecenium iodide, 8-methyl-1,8-diazabicyclo[5,4,0]-7-undecenium hydroxide, 8-methyl-1,8-diazabicyclo[5,4,0]-7- undecenium methylsulfate, 8-ethyl-1,8-diazabicyclo[5,4,0]-7-undecenium bromide, 8-propyl-1,8-diazabicyclo[5,4,0]-7-undecenium bromide, 8-dodecyl-1,8-diazabicyclo[5,4,0]-7-undecenium chloride, 8-dodecyl-1,8-diazabicyclo[5,4,0]-7-undecenium hydroxide, 8-eicosyl-1,8-diazabicyclo[5,4,0]-7-undecenium chloride, 8-tetracosyl-1,8-diazabicyclo[5,4,0]-7-undecenium chloride, 8-benzyl-1,8-diazabicyclo[5,4,0]-7-undecenium chloride (hereinafter, referred to as "DBU-B"), 8-benzyl-1,8-diazabicyclo[5,4,0]-7-undecenium hydroxide, 8-phenethyl-1,8-diazabicyclo[5,4,0]-7-undecenium chloride, and 8-(3-phenylpropyl)-1,8-diazabicyclo[5,4,0]-7-undecenium chloride. In order to achieve good crosslinkability and good physical properties of the resulting crosslinked product, preferred among these is DBU-B.

Examples of the quaternary phosphonium salts include, but are not limited to, tetrabutylphosphonium chloride, benzyltriphenylphosphonium chloride (hereinafter, referred to as "BTPPC"), benzyltrimethylphosphonium chloride, benzyltributylphosphonium chloride, tributylallylphosphonium chloride, tributyl-2-methoxypropylphosphonium chloride, and benzylphenyl(dimethylamino)phosphonium chloride. In order to achieve good crosslinkability and good physical properties of the resulting crosslinked product, preferred among these is benzyltriphenylphosphonium chloride (BTPPC).

Other examples of the crosslinking accelerator include solid solutions of quaternary ammonium salts with bisphenol AF, solid solutions of quaternary phosphonium salts with bisphenol AF, and the chlorine-free crosslinking accelerators disclosed in JP H11-14789 A.

The polyol cross-linking agent is preferably present in an amount of 0.01 to 10 parts by mass, more preferably 0.1 to 7 parts by mass, relative to 100 parts by mass of the fluorine-containing elastomer. Less than 0.01 parts by mass of the polyol cross-linking agent tends to cause insufficient crosslinking of the fluorine-containing elastomer, while more than 10 parts by mass thereof tends to cause a reduced balance of the physical properties.

The crosslinking accelerator is preferably present in an amount of 0.01 to 8 parts by mass, more preferably 0.02 to 5 parts by mass, relative to 100 parts by mass of the fluorine-containing elastomer. Less than 0.01 parts by mass of the crosslinking accelerator tends to inhibit sufficient crosslinking of the fluorine-containing elastomer, while more than 8 parts by mass of the crosslinking accelerator tends to cause a reduced balance of the physical properties.

In the case of crosslinking in a polyamine crosslinking system, the crosslinking point has a carbon-nitrogen double bond, which achieves excellent dynamic mechanical properties. Unfortunately, the compression set tends to be high compared with crosslinking with a polyol-based cross-linking agent or a peroxide-based cross-linking agent.

Examples of the polyamine-based cross-linking agent include polyamine compounds such as hexamethylenediamine carbamate, N,N'-dicinnamylidene-1,6-hexamethylenediamine, and 4,4'-bis(aminocyclohexyl)methane carbamate. Preferred among these is N,N'-dicinnamylidene-1,6-hexamethylenediamine.

The polyamine-based cross-linking agent is preferably present in an amount of 0.01 to 10 parts by mass, more preferably 0.2 to 7 parts by mass, relative to 100 parts by mass of the fluorine-containing elastomer. Less than 0.01 parts by mass of the polyamine-based cross-linking agent tends to cause insufficient crosslinking of the fluorine-containing elastomer, while more than 10 parts by mass thereof tends to cause a reduced balance of the physical properties.

The crosslinking system in the invention is preferably a peroxide crosslinking system, a polyol crosslinking system, or a polyamine crosslinking system. An appropriate crosslinking agent is preferably selected according to the crosslinking system. Preferred examples of the cross-linking agent include an organic peroxide, a polyhydroxy compound, and a polyamine compound.

Examples of the insulating thermal conductive filler used in the invention include metal oxides such as aluminum oxide, zinc oxide, titanium dioxide, beryllium oxide, magnesium oxide, nickel oxide, vanadium oxide, copper oxide, iron oxide, and silver oxide; silicon compounds such as quartz powder, silicon carbide, silicon nitride, silicon carbide, and mica; and nitrogen compounds such as boron nitride and aluminum nitride. Preferred among these is at least one selected from the group consisting of aluminum oxide, aluminum nitride, boron nitride, silicon nitride, silicon carbide, magnesium oxide, and zinc oxide, and more preferred is aluminum oxide.

The insulating thermal conductive filler is preferably further treated with a silane coupling agent. Examples of the silane coupling agent include, but are not limited to, methacryl-based silane, phenyl-based silane, vinyl-based silane, acryl-based silane, isocyanate-based silane, isocyanurate-based silane, ureido-based silane, mercapto-based silane, and perfluoro-based silane. The silane coupling agent is preferably at least one selected from the group consisting of methacryl-based silane, phenyl-based silane, vinyl-based silane, acryl-based silane, isocyanate-based silane, isocyanurate-based silane, ureido-based silane, mercapto-based silane, and perfluoro-based silane.

The insulating thermal conductive filler preferably has a particle size of 0.1 to 200 µm, more preferably 1 to 150 µm, still more preferably 2 to 100 µm.

The insulating thermal conductive filler is present in any amount, preferably 70 to 90% by volume, more preferably 70 to 85% by volume, of the fluorine-containing elastomer composition for a heat dissipation material. Less than 70% by volume of the insulating thermal conductive filler tends to reduce the thermal conductivity, while more than 90% by volume of the insulating thermal conductive filler tends to make rubber kneading difficult, to increase the hardness of the molded article, and to increase the Mooney viscosity of the fluorine-containing elastomer composition for a heat dissipation material, causing difficulty in molding.

The fluorine-containing elastomer composition for a heat dissipation material of the invention may optionally contain various additives usually added to a fluorine-containing elastomer composition according to need. Examples thereof include fillers (e.g., carbon black, barium sulfate), processing aids (e.g., wax), plasticizers, colorants, stabilizers, adhesive aids, release agents, electro-conductivity-imparting agents, surface non-adhesive agents, flexibility-imparting agents, heat resistance improvers, and flame retarders. The fluorine-containing elastomer composition may contain one or more general cross-linking agents and crosslinking accelerators that are different from those described above. For example, the carbon black preferably has an average particle size of 100 nm or more, more preferably 150 nm or more. The amount of the filler such as carbon black is preferably, but not limited to, 0 to 150 parts by mass, more preferably 1 to 100 parts by mass, still more preferably 2 to 50 parts by mass, relative to 100 parts by mass of the fluorine-containing elastomer. The processing aid such as wax is preferably present in an amount of 0 to 10 parts by mass relative to 100 parts by mass of the fluorine-containing elastomer that can be peroxide-crosslinked.

The molded article formed from the fluorine-containing elastomer composition for a heat dissipation material of the invention may have any thermal conductivity, preferably 0.5 W/mK or more, more preferably 1 W/mK or more. The thermal conductivity refers to a value determined by the laser flash method.

The molded article preferably has an Asker C hardness (peak value) of 80 or less, more preferably 50 or less. The Asker C hardness refers to a value determined by a method in conformity with JIS K7312.

The fluorine-containing elastomer composition for a heat dissipation material of the invention may have any 1% decomposition temperature, preferably 300° C. or higher, more preferably 330° C. or higher. The 1% decomposition temperature refers to a value determined by thermogravimetry.

The fluorine-containing elastomer composition for a heat dissipation material of the invention may have any weight reduction rate at 250° C. after 24 hours, preferably 5% or less, more preferably 3% or less. The weight reduction rate at 250° C. after 24 hours refers to a percentage obtained by placing the fluorine-containing elastomer composition in an electric furnace maintained at 250° C. for 24 hours and taking the composition out, and dividing the mass reduction of the composition before and after heating by the mass thereof before heating.

The invention also relates to a sheet obtainable by molding the fluorine-containing elastomer composition for a heat dissipation material. The sheet of the invention may be produced by molding the fluorine-containing elastomer composition for a heat dissipation material or by molding the fluorine-containing elastomer composition for a heat dissipation material and crosslinking the sheet. The sheet of the invention may be or may not be crosslinked. The sheet of the invention has excellent flexibility, thermal conductivity, and heat resistance, and is thus suitably used for a dissipation material of an exothermic body in a state of being inserted between a heatsink and an exothermic body such as a power semiconductor, between a heater and a heating-required part for freezing prevention, and between heat transport components for waste heat recovery. Specifically, the sheet of the invention can be used for a device including an exothermic high temperature region, such as a vehicle-mounted inverter, a DC-DC converter, a vehicle-mounted charger (on-board charger), an LED headlight, a GPU part for processing information obtained by automatic driving camera, and a TIM material inserted between a thermoelectric conversion element and a pipe.

Examples of the molding method include, but are not limited to, compression molding, extrusion molding, transfer molding, and injection molding.

Conditions for crosslinking may be appropriately set according to the types of the components used such as a cross-linking agent, for example. Crosslinking is usually performed by baking at a temperature of 150° C. to 300° C. for one minute to 24 hours. The crosslinking may be performed at an ordinary pressure, increased pressure, or reduced pressure, or in the air.

Crosslinking may be performed by any method such as steam crosslinking, press molding, a general method in which a crosslinking reaction is initiated by heating, or radiation crosslinking at normal temperature and pressure. First crosslinking (referred to as primary crosslinking) may be followed by an aftertreatment step referred to as secondary crosslinking.

EXAMPLES

The invention will be described hereinbelow with reference to examples. The invention is not intended to be limited to these examples.

The materials used in the examples and comparative example shown in Table 1 are as follows.
<Fluorine-Containing Elastomer>
Fluorine-containing elastomer (1): a VdF/HFP copolymer with a VdF/HFP mol % composition of 78/22 and ML1+10 (121° C.) of =3
Fluorine-containing elastomer (2): a VdF/HFP copolymer with a VdF/HFP mol % composition of 78/22 and ML1+10 (121° C.) of <0.1 (below the measurement limit)
Fluorine-containing elastomer (3): a VdF/HFP copolymer with a VdF/HFP mol % composition of 78/22 and ML1+10 (121° C.) of 25
Aluminum oxide (A50BC available from Showadenkosya Co., Ltd., particle size of 1 to 100 μm, treated with methacryl silane)

Examples 1 and 2 and Comparative Example 1

Fluorine-containing elastomer compositions 1 to 3 were prepared, each having a composition as shown in Table 1. Each of the fluorine-containing elastomer compositions was prepared by mixing a fluorine-containing elastomer (raw rubber) and aluminum oxide in the amounts shown in Table 1 with Labo Plast Mill by a usual method. The resulting fluorine-containing elastomer compositions 1 to 3 were each molded into a sheet.

The physical properties of the compositions (sheets) obtained in the examples and comparative example were determined by the following methods. Table 1 shows the results.
<Mooney Viscosity (ML1+10 (121° C.))>
The Mooney viscosity (ML1+10 (121° C.)) was determined in conformity with ASTM D1646 and JIS K6300.
Measurement device: model MV2000E available from Alpha Technologies Inc.
Rotational speed of rotor: 2 rpm
Measurement temperature: 121° C.
<Thermal Conductivity>
The thermal conductivity was determined by the laser flash method.
Measurement device: TC-7000 available from ULVAC-RIKO
Method for determining the thermal diffusivity: half-time method
Measurement temperature: 25° C. (room temperature)
<Asker C Hardness>
The Asker C hardness was measured in conformity with JIS K7312.
Measurement device: a durometer (Asker rubber durometer type C) available from Kobunshi Keiki Co., Ltd.
Hardness: The peak value and the value after three seconds were measured.
Measurement temperature: 25° C. (room temperature)
The parenthesized values in the table represent the values measured after three seconds.
<1% Decomposition Temperature>
Measurement device: STA7000 available from Hitachi High-Tech Science Corporation
Temperature increasing rate: 10° C./min
Atmosphere: air
Pan: an aluminum pan <Weight Reduction Rate>

The fluorine-containing elastomer composition was placed in an electric furnace maintained at 250° C. for 24 hours and then taken out. The percentage value obtained by dividing the mass reduction of the composition before and after heating by the mass thereof before heating was taken as the weight reduction rate.

TABLE 1

|  |  | Example 1 | Example 2 | Comparative Example 1 |
|---|---|---|---|---|
| Fluorine-containing elastomer composition |  | 1 | 2 | 3 |
| Fluorine-containing elastomer (1) | vol % | 25 | 0 | 0 |
| Fluorine-containing elastomer (2) | vol % | 0 | 25 | 0 |
| Fluorine-containing elastomer (3) | vol % | 0 | 0 | 25 |
| Aluminum oxide | vol % | 75 | 75 | 75 |
| Thermal conductivity | W/m · K | 3.0 | 3.0 | 3.0 |
| Asker C hardness |  | 80 (75) | 40 (6) | 97 (96) |
| 1% Decomposition temperature | ° C. | 389 | 349 | 381 |
| Weight reduction rate | % | 0.54 | 2.53 | 0.61 |

INDUSTRIAL APPLICABILITY

The fluorine-containing elastomer composition for a heat dissipation material of the invention has excellent flexibility, thermal conductivity, and heat resistance, and is thus suitably used for a dissipation material of an exothermic body in a state of being inserted between a heatsink and an exothermic body such as a power semiconductor, between a heater and a heating-required part for freezing prevention, and between heat transport components for waste heat recovery. Specifically, the composition of the invention can be used for a device including an exothermic high temperature region, such as a vehicle-mounted inverter, a DC-DC converter, an LED headlight, a GPU part for processing information obtained by automatic driving camera, and a TIM material inserted between a thermoelectric conversion element and a pipe.

The invention claimed is:

1. A fluorine-containing elastomer composition for a heat dissipation material, consisting of:
    a fluorine-containing elastomer, said fluorine-containing elastomer being vinylidene fluoride (VdF)-based fluoroelastomer having a Mooney viscosity at 121° C. of 10 or lower;
    an insulating thermal conductive filler, and
    optionally an additive selected from the group consisting of a filler, a processing aid, a plasticizer, a colorant, a stabilizer, a flexibility-imparting agent, a heat resistance improver, and a flame retarder,
    wherein the insulating thermal conductive filler is present in an amount of 75 to 90% by volume of the fluorine-containing elastomer composition for a heat dissipation material.

2. The fluorine-containing elastomer composition for a heat dissipation material according to claim 1,
    wherein the fluorine-containing elastomer contains at least one copolymer selected from the group consisting of VdF/HFP copolymer, VdF/HFP/TFE copolymer, and a copolymer of VdF and a fluorine-containing monomer represented by the formula (2):

$$CH_2=CFRf \quad (2)$$

wherein Rf is a C1-C12 linear or branched fluoroalkyl group.

3. The fluorine-containing elastomer composition for a heat dissipation material according to claim 1,
    wherein the insulating thermal conductive filler is at least one selected from the group consisting of aluminum oxide, aluminum nitride, boron nitride, silicon nitride, silicon carbide, magnesium oxide, and zinc oxide.

4. The fluorine-containing elastomer composition for a heat dissipation material according to claim 1,
    wherein the insulating thermal conductive filler is treated with a silane coupling agent.

5. The fluorine-containing elastomer composition for a heat dissipation material according to claim 1,
    wherein the insulating thermal conductive filler has a particle size of 0.1 to 200 μm.

6. A sheet obtained by molding the fluorine-containing elastomer composition for a heat dissipation material according to claim 1.

* * * * *